United States Patent [19]
Redman

[11] Patent Number: 6,045,324
[45] Date of Patent: Apr. 4, 2000

[54] STACKING CLAMP

[76] Inventor: Paul W. Redman, 14 Thirlmere Road, London, Ontario, Canada, N6G 4R1

[21] Appl. No.: 09/023,090

[22] Filed: Feb. 13, 1998

[51] Int. Cl.[7] ...................................................... B65B 35/32
[52] U.S. Cl. ..................................... 414/795.3; 414/788.9; 414/795.2; 414/794.9; 53/541
[58] Field of Search ............................ 414/795.3, 794.9, 414/788.9, 795.2, 789.7; 53/541

[56] References Cited

U.S. PATENT DOCUMENTS

| | | |
|---|---|---|
| 3,139,993 | 7/1964 | Lauer . |
| 3,420,387 | 1/1969 | Baum .................................... 414/794.9 |
| 3,450,275 | 6/1969 | Carlen, Jr. ............................. 414/795.3 |
| 3,458,058 | 7/1969 | Faerber ................................. 414/795.3 |
| 3,595,370 | 7/1971 | Fujishiro ............................... 414/788.9 |
| 3,866,763 | 2/1975 | Alduk .................................... 414/795.3 |
| 4,252,496 | 2/1981 | Williams . |
| 4,501,107 | 2/1985 | Piotrowski ................................ 53/541 |
| 4,639,181 | 1/1987 | Tsubouchi .............................. 414/349 |
| 4,684,308 | 8/1987 | Dorner ................................... 414/795.3 |
| 4,701,090 | 10/1987 | Reynaud et al. . |
| 4,778,323 | 10/1988 | Salts ..................................... 414/795.3 |
| 5,161,934 | 11/1992 | Richardson . |
| 5,185,988 | 2/1993 | Cunningham ......................... 414/795.3 |
| 5,328,322 | 7/1994 | Neri ...................................... 414/796.9 |
| 5,336,039 | 8/1994 | House . |
| 5,516,255 | 5/1996 | Tygard . |

FOREIGN PATENT DOCUMENTS

| | | | |
|---|---|---|---|
| 296601 | 12/1988 | European Pat. Off. ............ | 414/795.3 |
| 359920 | 3/1991 | European Pat. Off. ............ | 414/788.9 |
| 0587929 | 3/1994 | European Pat. Off. . | |
| 3031662 | 3/1982 | Germany ............................ | 414/795.3 |
| 4109293 | 10/1991 | Germany . | |
| 96/31420 | 10/1996 | WIPO . | |

*Primary Examiner*—Douglas Hess
*Attorney, Agent, or Firm*—Michael M. Sakovich

[57] ABSTRACT

Apparatus for stacking selected layers of products on a pallet comprises an upstanding frame having two side walls, a back wall forming a close with the side walls, an open entry side and an open uppermost end defined by peripheral frame members. Clamp means circumscribe the uppermost end in unobstructive overhead relation within the close and surrounding frame members to provide an inwardly directed clamping pressure between the side walls and between the back wall and frame members positioned above the entry side. Clamping pressure is generated by inflatable air bags positioned between the peripheral frame members and pressure plates facing inwardly of the close. Layers of products from successive pallet loads are placed by a forklift truck into the apparatus through the open side. A selected layer is raised and supportively clamped. The remaining pallet load is lowered and withdrawn. Successive pallet loads of different products are placed into the apparatus and raised to engage the lowermost surface of the previous clamped layer which is then released. The combined load is raised to the next selected layer and reclamped, the remainder being lowered and withdrawn. Loads extending above the apparatus are confined within a safety cage in a further embodiment which also includes a safety curtain to support the load in the event of clamp means failure. On completion of stacking, clamping pressure is released and the entire load of assorted product layers is lowered and withdrawn.

32 Claims, 7 Drawing Sheets

STACKING CLAMP

FIELD OF THE INVENTION

This invention relates to stacking apparatus and more particularly to such apparatus having utility in selective layering of containers, packages, and unpackaged or crated objects generally.

BACKGROUND OF THE INVENTION

Selective layering of products such as cases of beer bottles, cans, crated produce and other such items is a common occurrence during the assembly and preparation of a shipment of goods to consumer distribution points. A notable example may be seen in the brewing industry where a final product in the form of bottled beer packaged in corrugated paper containers is shipped to various distribution centers under a variety of labels, different brands and the like. This is a frequent occurrence particularly amongst smaller distribution centers, including taverns, hotels and restaurants which are most likely to call for a mixed variety of beer products.

The distribution of farm or grower produce is another good example. Thus, a palletized shipment of fruit may include a number of individual or mixed layers of crated citrus fruits, non-citrus fruits, vegetables and the like.

Varying pallet orders of the aforementioned types can be manually assembled by individually selecting various containers or packages of a desired product and hand stacking the packaged products onto a selected order pallet. This procedure, however, is both time consuming and ergonomically inefficient and difficult.

In recognition of this problem, various stacking and clamping devices have been developed to provide selective layering of the aforementioned packaged goods. Under ideal conditions, manual handling is eliminated by selecting individual layers of packaged products and selectively layering individual product layers to form a picked order pallet. A typical example of such apparatus is disclosed in U.S. Pat. No. 5,516,255 Tygard which describes clamping apparatus utilized in connection with a forklift truck for lifting objects arranged in layers comprising both square and elongated rectangular objects. The apparatus comprises two pairs of clamps positioned in mutually orthogonal relation and which are actuated by an obstructing overhead-positioned hydraulically operated arrangement of cylinders and pistons. A second disclosed embodiment utilizes only a single pair of clamping arms and may be employed where a plurality of objects are rigidly interconnected or where only a single object is required to be lifted. The clamping apparatus is utilized to grip the object while a forklift truck raises the gripped object for placement upon a picked order pallet.

An anticipated problem with the Tygard device, as well as other such selective layering devices, is found in the obstructing overhead operating mechanism used to actuate oppositely positioned pairs of clamps. Such an overhead clamping mechanism limits the apparatus to picking up only a single layer of preassembled objects and at most only two layers provided that sufficient overhead clearance is present. A general limitation of such apparatus is therefore an inability to stack more than two layers at a time when assembling a picked order pallet of work products or objects.

SUMMARY OF THE INVENTION

Having regard to the aforedescribed problem in apparatus used for setting up a predetermined layered order of objects on a pallet, a principal objective of the present invention is improved apparatus having an unobstructive overhead clamp arrangement that overcomes the stacking limitations of the prior art.

Another objective of the invention is to provide stacking apparatus that is self-supporting.

A further objective of the invention is to provide stacking apparatus having an open entry side with guide means that assist in centering a preassembled layer of work products entering the apparatus on a pallet carried by a forklift truck.

Yet another objective of the invention is stacking apparatus employing expanding air bags operably responsive to the application of compressed air for actuating the apparatus clamps.

Still another objective of the invention is stacking apparatus embodying safety features that prevent injury to personnel by dislodged overhead work products.

The problems associated with the prior art may be substantially overcome and the foregoing objectives achieved by recourse to the invention which relates to apparatus for stacking work products comprising, in combination, first and second upstanding side walls disposed upon a supporting surface in spaced apart and substantially parallel relation, a back wall disposed intermediate the side walls and forming a close therewith having an open entry side and an open uppermost end, and clamp means disposed in unobstructive relation of the open uppermost end to provide an inwardly directed controllable clamping force intermediate the side walls for releasably gripping a work product.

BRIEF DESCRIPTION OF THE DRAWINGS

The invention will now be more particularly described with reference to embodiments thereof shown, by way of example, in the accompanying drawings in which.

DETAILED DESCRIPTION OF THE PREFERRED EMBODIMENTS

Figure 1:
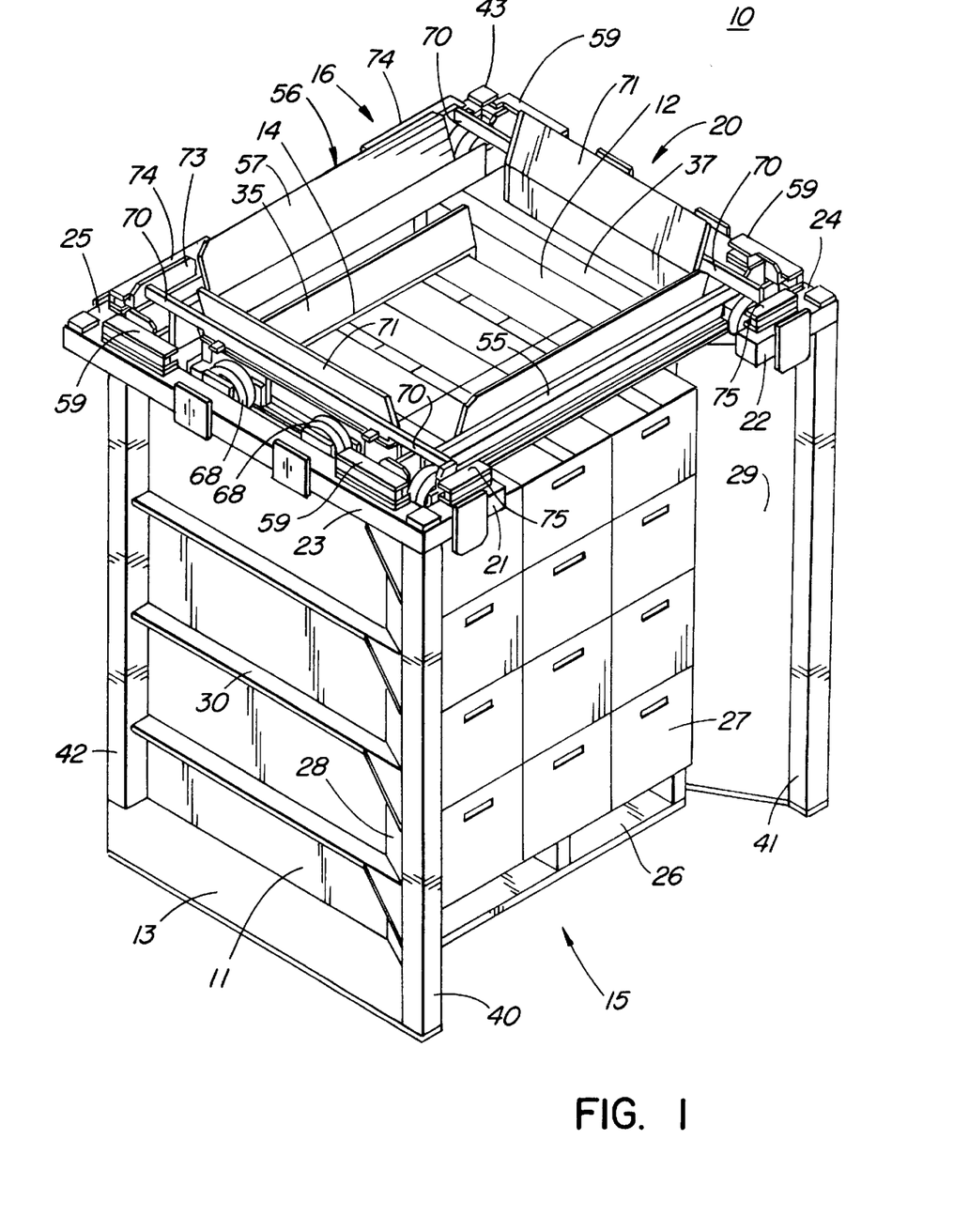
FIG. 1 is a perspective view of apparatus for stacking work products in accordance with the invention.

A perspective view of an apparatus 10 for stacking work products is illustrated in FIG. 1. It will be observed that the apparatus 10 comprises first and second upstanding side walls 11 and 12, respectively, which are disposed upon a flat base plate 13 in spaced apart and substantially parallel relation. A back wall 14 is disposed intermediate the walls 11 and 12 and forms a three-sided close having an open entry side 15 and an open uppermost end 16.

Clamp apparatus 20 unobstructively circumscribes the open uppermost end 16 and is configured to provide an inwardly directed controllable clamping force intermediate the side walls 11 and 12 and intermediate the back wall 14 and a pair of front frame members 21 and 22. It will be understood that the side and back walls include corresponding frame members in the same plane as the members 21 and 22. Thus, it will be seen that the wall 11 includes a side frame member 23 positioned outwardly of the uppermost end of the wall. Correspondingly, a second side frame member 24 is positioned outwardly of the wall 12 alongside the uppermost end thereof. A back frame member 25 is similarly positioned outwardly of the uppermost end of the back wall 14 and lies in the same plane as the members 21, 22, 23 and 24.

A pallet 26 of the type commonly used as a load bearing platform for carrying work products by a forklift truck is shown centrally positioned within the apparatus 10. Uniformly distributed upon the pallet 26, a plurality of prearranged layers of work products depicted as beer cases 27 are shown as they would be initially placed within the apparatus. Selective layering is performed by raising the pallet 26 to a predetermined position, clamping a selected layer of the cases by the clamp apparatus 20, lowering the remaining layers of cases 27 on the pallet 26 and withdrawing same from the open entry side 15. Subsequent pallet loads of cases 27 are placed within the apparatus 10 by way of the forklift truck and raised to engage the lowermost surface of the previous layer held in place by the clamp apparatus 20. The placement of each subsequent layer entails releasing clamping pressure on the clamped layer and raising the accumulated layers by means of the forklift truck until the lowermost layer is positioned and clamped to support all the layers of cases 27 above it. Following selection of the various layers of cases, an empty pallet 26 is inserted into the apparatus 10 by means of the forklift truck and is raised to engage the bottom surface of the clamped layer. Clamping pressure is then released and the entire load of assorted layers of cases 27 is lowered and withdrawn.

As described, the function of the apparatus 10 is to provide selective layering of cases or packages containing such products as beer bottles, cans, and the like. Although not described herein, it will be understood that such functionality extends to selective layering of either packaged or crated goods generally. An example of the latter would be crated produce. It will be also understood that although the apparatus 10 is intended to selectively layer preassembled layers of cases or packages, the apparatus 10 may also be used effectively for handling individual cases, packages or objects as required, which will be apparent in the description that follows.

In order to correctly center the pallet 26, the apparatus 10 includes means for guiding the pallet and its load centrally into the apparatus via the open entry side 15. Such guide means comprises a pair of sloping side walls 28 and 29 that are disposed convergingly inwardly as may be readily seen in FIGS. 1 and 2. In this manner, the walls 28 and 29 join respective ones of the walls 11 and 12 as extensions thereof.

Rough usage of the apparatus is to be expected under the circumstances which is accommodated by reinforcing the back and side walls using stiffeners 30 as best seen in FIG. 1. It will be understood that such stiffeners are employed on each one of the walls 11, 12 and 14 for reinforcement purposes.

Figure 3:
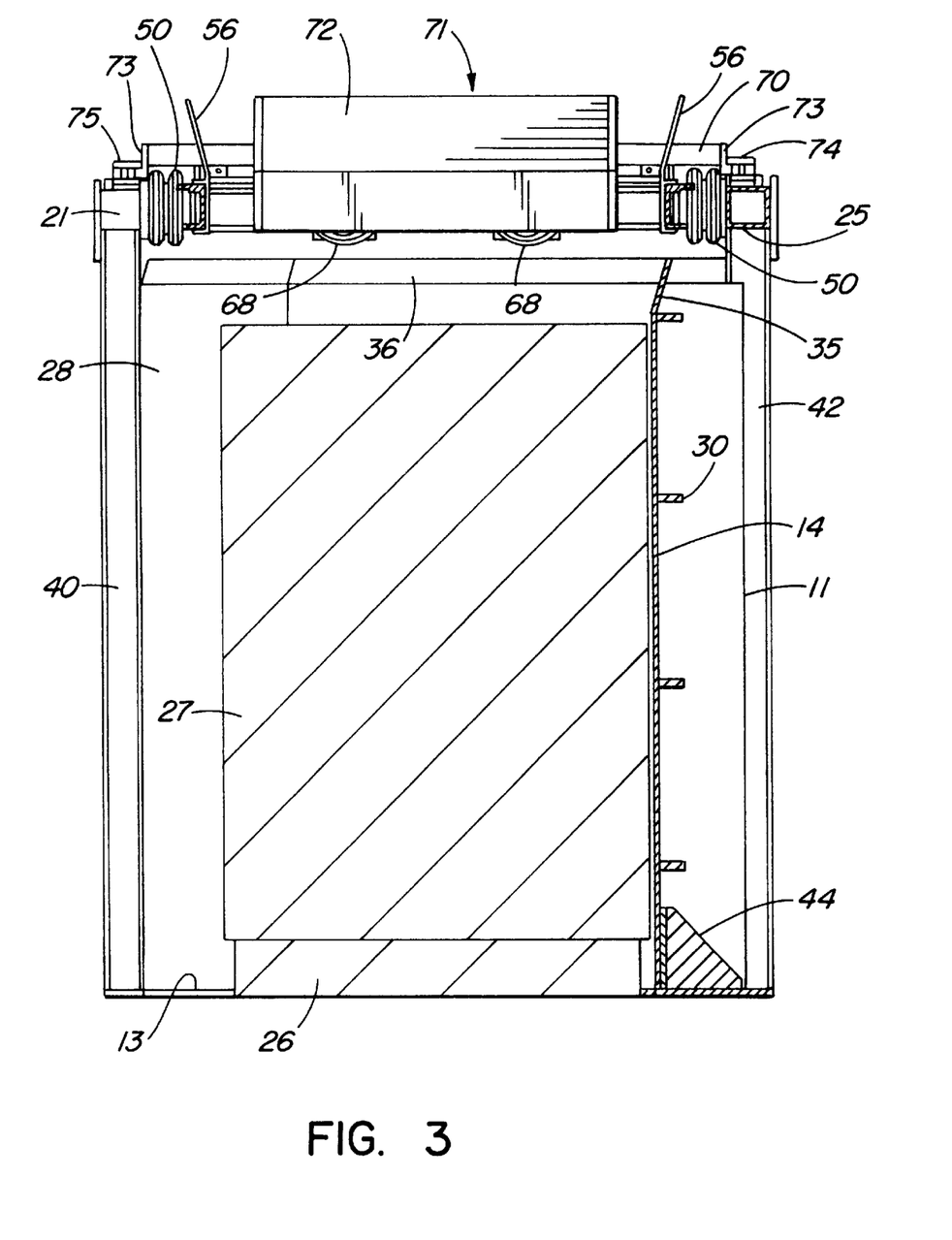
FIG. 3 is a cross-sectional view of the apparatus illustrated in FIG. 2 taken along the lines 3—3.
Figure 4:
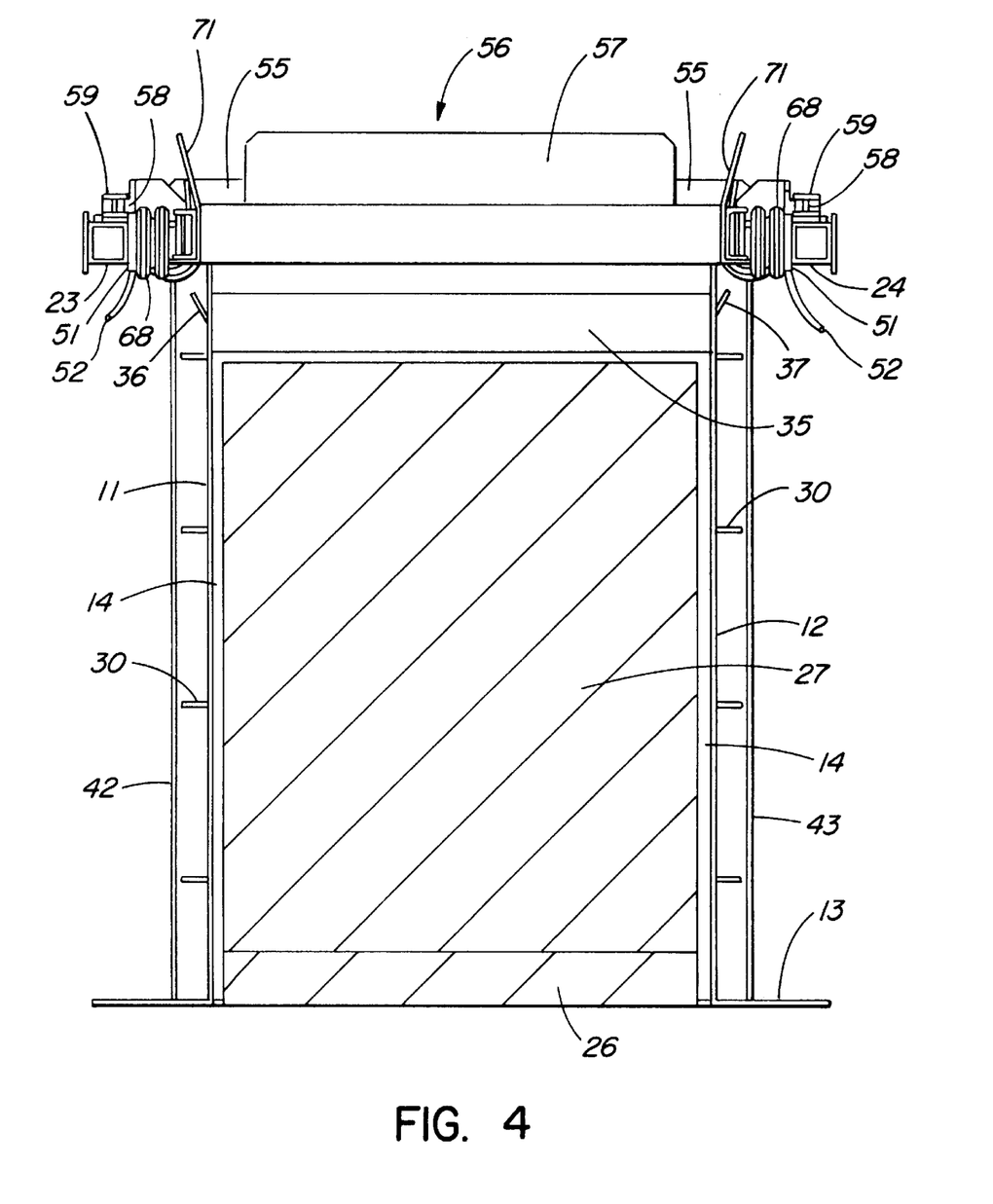
FIG. 4 is a cross-sectional view of the apparatus of FIG. 2 taken along the lines 4—4.

To prevent damaging or defacing the cases 27 on the free uppermost end of the walls 11, 12 and 14, an uppermost edge portion of each such wall is bent divergingly outwardly as shown in FIGS. 1, 3 and 4. Without such an accommodation, any beer cases 27 that are misaligned vertically could be snagged and consequently damaged by the free edges of the walls. This possibility is obviated as a result of the outwardly bent portion 35 of the wall 14 and corresponding bent portions 36 and 37 of the walls 11 and 12, respectively.

The remaining frame structure of the apparatus 10 includes a pair of front frame columns 40 and 41 to which are joined the walls 28 and 29, respectively. Additionally, a pair of rear frame columns 42 and 43 have joined thereto the walls 11 and 12, respectively. The back wall 14, however, is joined to side walls 11 and 12 as may be seen in FIGS. 3 and 4. As shown in the drawings, members 21–25 are also joined to the columns to complete the frame configuration.

Figure 2:
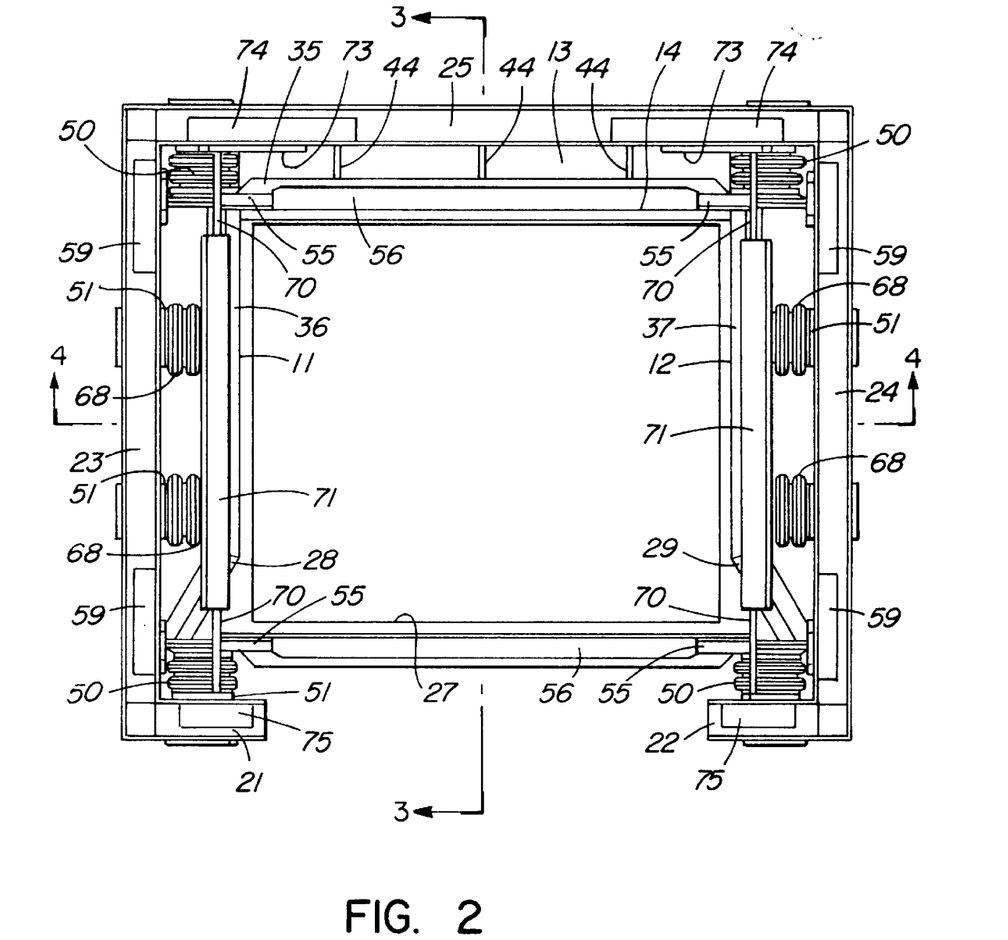
FIG. 2 is a top plan view of the apparatus of FIG. 1.

The cross-section view of FIG. 3 illustrates the position of the back wall 14 within the frame of the apparatus 10 wherein it will be observed that the wall 14 is spaced inwardly of the column 42. In addition to the stiffeners 30 used for reinforcement, the wall 14 is further reinforced by a plurality of gussets 44 that are affixed to the wall 14 and the plate 13. As shown in FIG. 2, the gussets 44 are uniformly spaced along the plate 13.

In order to grip and hold firmly a stack of layered cases 24, the clamp apparatus 20 exerts a circumscribing compressive force that is directed inwardly of the apparatus 10 between opposing frame members. This characteristic is readily observed in the plan view of FIG. 2.

Figure 5:
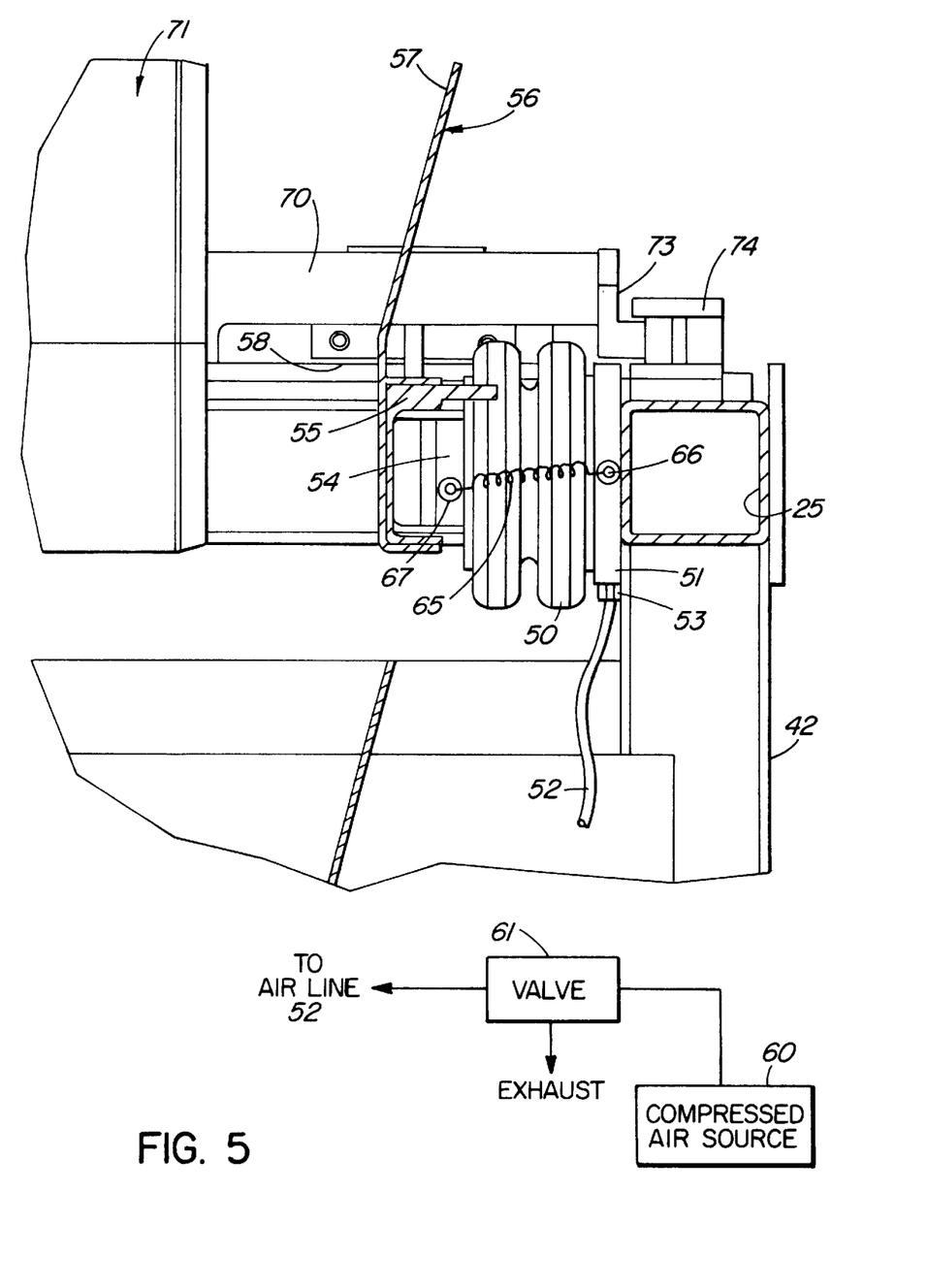
FIG. 5 is an enlarged view of a portion of the apparatus illustrated in FIG. 3.

Considering firstly the compressive force exerted between the frame members 21 and 25 and between the frame members 22 and 25, it will be observed in FIG. 2 that the inwardly directed compressive force is generated by opposing pairs of inflatable air bags shown as resilient cylinders 50 having pleated side walls which are adapted to extend flexibly along the longitudinal axis of the cylinder. It will be seen that one end of each cylinder 50 is attached to its respective frame member 21, 22 and 25 by way of a header 51 that is configured with air passages (not shown), which communicate with both the interior of the cylinder 50 and an air line 52 via an air line coupler 53. This structure is best seen in an enlarged partial cross-section view of FIG. 5 representing a corresponding portion of FIG. 3. The line 52 of each cylinder 50 is connected to a compressed air source 60 having a pressure generating capability of at least 50 pounds per square inch (343 kPA).

The other end of each cylinder 50 is connected via a mounting plate 54 to a longitudinal bar 55 that spans the interior width of the apparatus 10 between the side frame members 23 and 24 as shown in FIGS. 2 and 4. Two opposing bars 55 are shown. FIG. 5 illustrates in cross-section the attachment of the bar 55 to a pressure plate 56 having a sloping wall portion 57 that is disposed divergingly outwardly of the apparatus interior.

FIG. 4 illustrates the respective ends of one bar 55 which are configured as cam followers 58 that are held slidably captive within channel-shaped guide members shown as follower guides 59. It will be understood that the guides 59 are attached to the side frame members 23 and 24 by known attachment means such as by threaded screw fasteners or welding. As air pressure is applied to the cylinders 50, the cylinders expand along their longitudinal axes and carry the opposing pair of longitudinal bars 55 inwardly together with their respective pressure plates 56 to engage a selected layer of the cases 27 that was previously positioned by the forklift truck.

Clamping pressure exerted by the plates 56 is released by removing air pressure from the cylinders 50 via the lines 52 and a control valve 61. To ensure complete withdrawal of each plate 56 from its clamping position upon air pressure release, a return spring 65 is employed as indicated in FIG. 5. Threaded fasteners 66 and 67 secure the respective ends of the spring to the header 51 and plate 54 as illustrated.

A similar clamping arrangement is provided to generate an inwardly directed side pressure. Thus, opposing pairs of resilient cylinders 68 are connected to their respective side frame members 23 and 24 by means of headers 51 as previously described for the cylinders 50. Each opposite end of the cylinders 68 is attached by means of its mounting plate 54 to a longitudinal bar 70 which carries a side pressure plate 71 (FIG. 2). Like the plate 56, the plate 71 includes an outwardly diverging sloping wall portion 72 to prevent snagging the cases 27 when the pallet 26 is raised and particularly when lowered by the forklift truck. Case scuffing is also minimized by coating the plates 56 and 71 with urethane of 50–60 durometer.

Similar to the bars 55, the free ends of each bar 70 are each configured as a cam follower 73 which is best seen in the enlarged detail of FIG. 5. It will be observed therein that the cam follower 73 at one end of each bar 70 is slidably retained within a channel-shaped follower guide 74 that is mounted on the back frame member 25. The corresponding cam follower 73 on the opposite end of the bar 70 is likewise slidably retained within a similar but shorter follower guide 75 that is mounted on the front frame members 21 and 22.

Lateral clamping pressure on the cases 27 is exerted in the same manner as described for the clamping pressure exerted between the front frame members 21, 22 and the back frame member 25. As air pressure is applied to the oppositely positioned cylinders 68, extension thereof moves the bars 70 inwardly, thus displacing their pressure plates 71 to engage laterally the same layer of cases 27, as previously described, which were raised to that level by the forklift truck. Pressure release likewise results in return to a rest position by the cylinders 68 in the same manner as for the cylinders 50.

Although the cylinders 50 and 68 are positioned coplanarly, it will be observed that the bar 55 is in the same plane as the resilient cylinders but that the bar 70 is positioned in a higher plane. This occurs due to a vertical height difference in the configuration of the cam followers 58 and 73, the latter being greater in height to avoid interference between the bars 55 and 70 when clamping pressure is applied. In addition, it will be seen that the pressure plates.56 and 71 are shorter than their respective bars 55 and 70 to provide necessary clearance between the plates when placed in a clamping mode.

Figure 6:
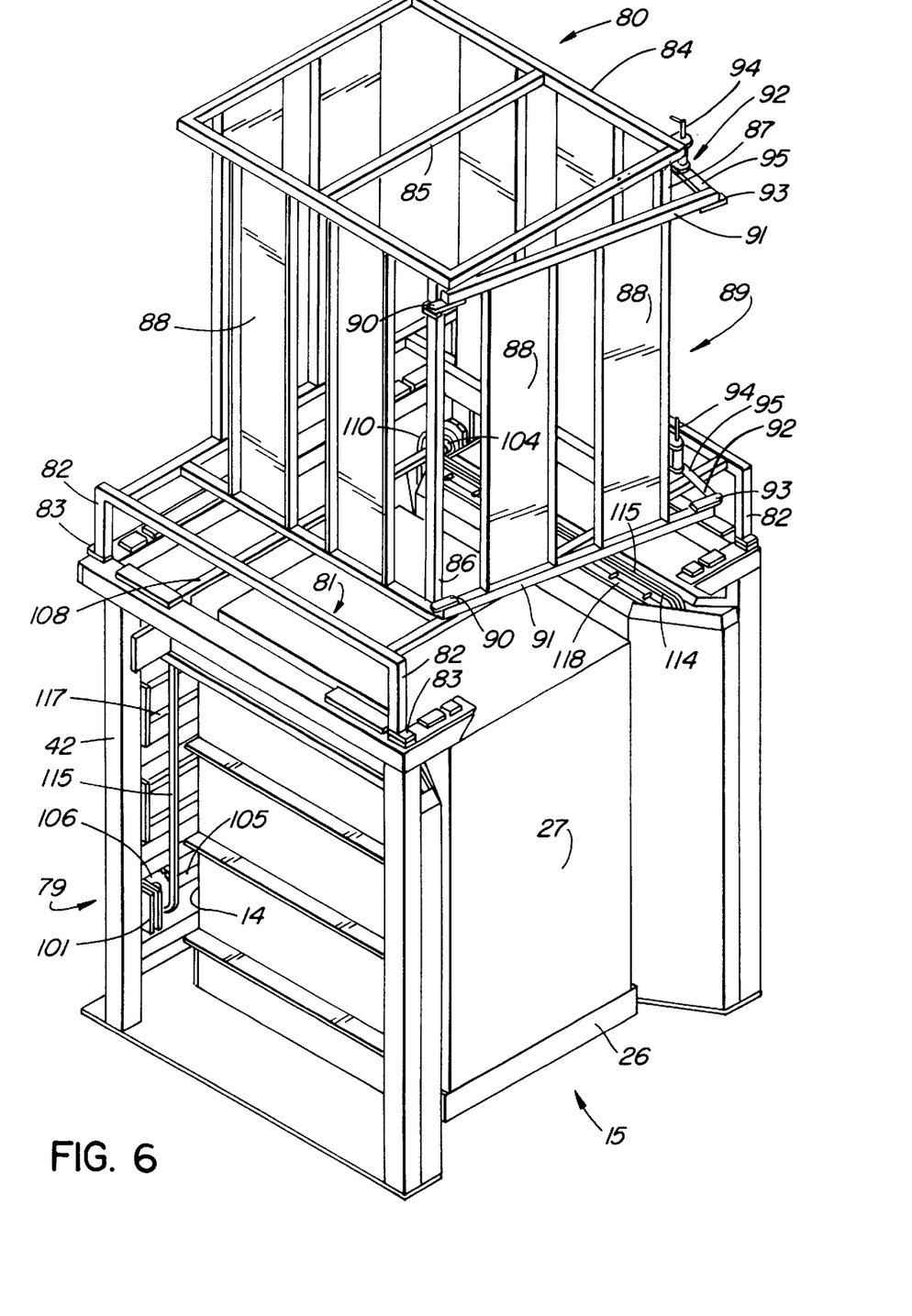
FIG. 6 is a perspective view of a safety cage supportively mounted on another embodiment of apparatus for stacking work products in accordance with the invention.

A perspective view of a safety cage 80 is shown in FIG. 6 supportively mounted upon a stacking apparatus 79 that is similar to the apparatus 10 of FIG. 1. Like components are therefore identified by like numbered designations. The cage 80 includes a base frame 81, fabricated from tubing of square cross-section, which is mounted upon the apparatus 79. The frame 81 is positioned substantially in registry with the close of the apparatus 79 and is attached to the apparatus via four upstanding corner tubes 82, each of which include a mounting foot 83. Attachment to the apparatus 79 by each foot 33 is achieved by conventional threaded screw fasteners or by welding as an alternative example.

Construction of the cage 80 is similar to that of its base frame. Thus square cross-section tubing 84 defines the uppermost perimeter of the cage. A similar tube 85 functions as a cross member support which also limits the height to which work products may be stacked. Vertical columns 86 and 87, together with a plurality of upstanding channel-shaped panels 88 substantially enclose three sides of the cage 80 as illustrated. A fourth side is open and is closed by a gate 89 having upper and lower hinges 90 that are attached to the column 86. Each hinge is also connected to a corresponding frame member 91. The gate structure as a closure is completed by a pair of panels 88 disposed between the members 91.

It will be observed that the free end of each member 91 terminates in lower and upper stop bars 92 having an orthogonal portion that is attached to its corresponding member 91. A convenient form for such attachment is by welding. An aperture 93 in each bar 92 is adapted for engagement with a lock pin 94 to ensure that the gate 89 is secure in its closed position. In this regard, it will be understood that an extended portion 95 of the bar 92 provides a sliding surface upon which the pin 94 rests when the gate 89 is partially open as illustrated in FIG. 6. This is a safety feature that indicates to operating personnel that the gate 89 is not securely locked, as when the gate is partially open and the pin 94 is upstanding from the portion 95 and has not dropped into its corresponding aperture 93. Enhancement of this safety feature is achieved by identifying each pin 94 with a bright, readily noticeable color.

Functionally, the cage 80 serves to confine pallet loads of products that are raised overhead above the apparatus 79 and clamped in place as hereinbefore described. In the commonly occurring event of the apparatus 79 being struck by a forklift truck, either delivering or retrieving a pallet, all products that are clamped in place above the apparatus 79 are confined within the cage 80 and as a result would not topple over and cause injury to nearby personnel or damage the products.

Figure 7:
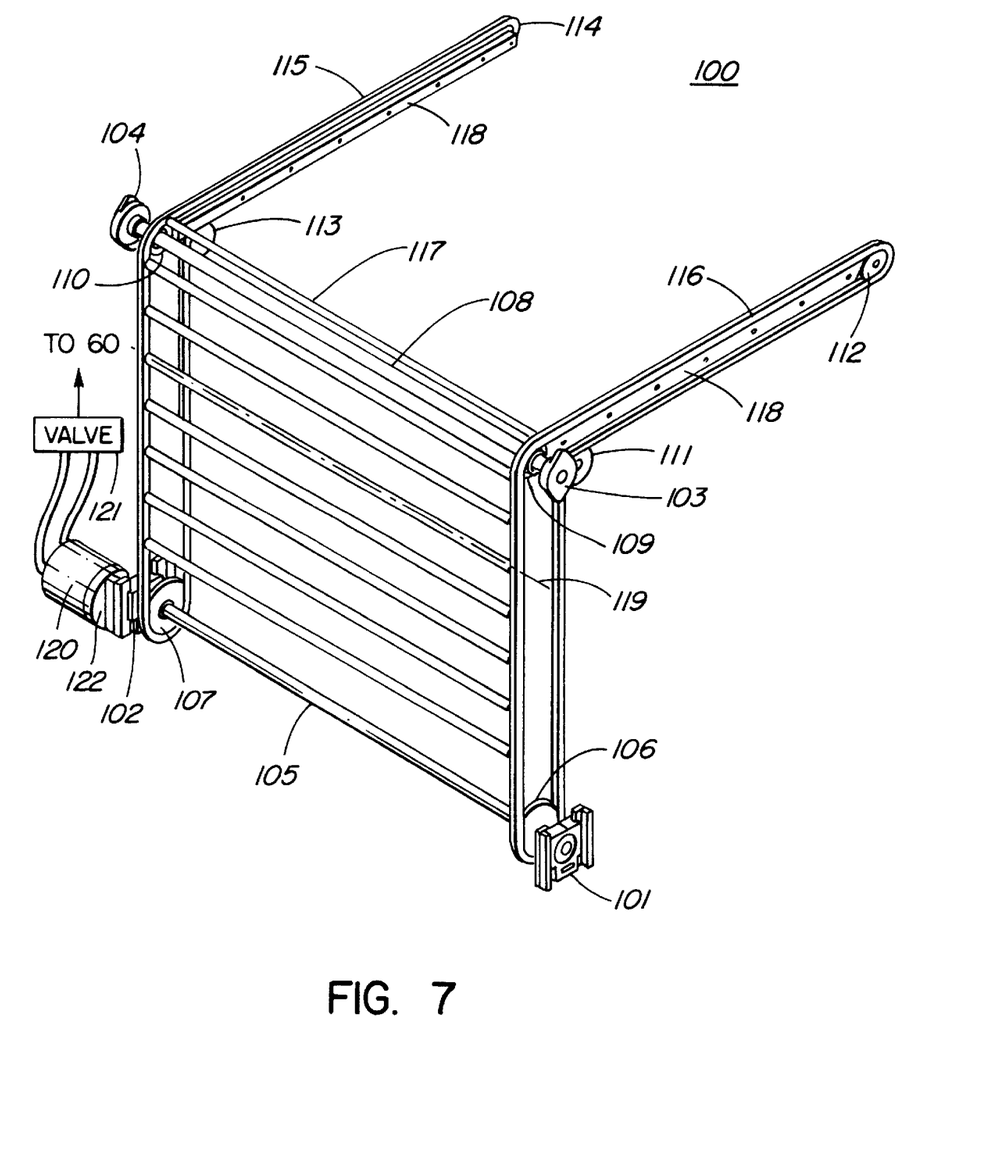
FIG. 7 is a perspective view of a safety curtain embodiment for the apparatus of FIG. 6.

FIG. 7 is a perspective view of an optional safety roller drive assembly 100 which functions as a protective safety curtain to support an overhead load within the apparatus 79 in the event of clamp apparatus 20 failure. Placement of the assembly 100 may be seen in FIG. 6 where it will be observed that a take-up bearing 101 is secured to a side wall of the column 42 within the space between the plane of the back wall 14 and the plane in which columns 42 and 43 reside. While not shown, it will be understood that a corresponding bearing 102 is similarly secured on the column 43. Although hidden from view, it will be further understood that a flange bearing 103 is similarly mounted adjacent the uppermost end of the column 42 and that a corresponding flange bearing 104 is likewise mounted on its column 43. A shaft 105 is journalled in bearings 101 and 102 and carries a sprocket 106 adjacent the bearing 101 and a sprocket 107 adjacent the bearing 102 as illustrated.

In a similar manner, a shaft 108 is journalled in bearings 103 and 104 and carries sprockets 109 and 110 positioned inwardly of and adjacent to their respective bearings 103 and 104. Idler sprockets 111, 112, 113 and 114 function to support and guide first and second roller chains 115 and 116 as illustrated. Although portions of the assembly 100 installed in the apparatus 79 are hidden from view, the respective locations of the installed sprockets, bearings, and roller chains within the apparatus 79 to achieve an interference free installation will be evident from FIG. 6 when viewed in conjunction with FIG. 7.

In the possible event of clamp apparatus 20 failure, the work product load would be released and fall upon a plurality of safety rollers 117, the respective ends of which would be resting upon corresponding support bars 118. Although each roller 117 is rotatably attached to its corresponding chain 115, 116, by means of pins 119, the shear strength of the pins cannot be relied upon to withstand the impact of the dropped work product load. The larger diameter rollers 117 resting upon the support bars 118 however are capable of supporting the load.

The function of the safety curtain is to prevent work products from falling in the event of clamp apparatus 20 failure as described. In so doing, the curtain retracts each time a load is brought into the apparatus 79 and extends when the load is removed. This is achieved in the embodiment illustrated by means of a reversible pneumatic motor 120 operating from the compressed air source 60 through a known manually operable control valve 121.

A suitable type of drive coupling from the motor 120 to the shaft 105 would be a known friction clutch 122. Resulting rotation of the shaft 105 would drive the endless roller chains 115 and 116, carrying the plurality of safety rollers 117 along the support bars 118 directly under a clamped load above the apparatus 79. In this arrangement, stop means (not shown) limit the travel of the rollers 117 at the sprockets 112 and 114. A similar arrangement may be provided for the return of the rollers 117 by employing stop means (not shown) intermediate the sprockets 106 and 107 to prevent the rollers from progressing past this point when the safety curtain retracts.

Clamp apparatus 20 and its supporting structure has been omitted in the embodiment of FIG. 6 to more clearly illustrate the placement of the cage 80 upon the apparatus 79 and the assembly 100 therewithin. Although some of the components to which reference has been made are hidden from view in FIG. 6, the description provided will be sufficient for those skilled in the art to correctly install the assembly 100.

To those individuals skilled in the art to whom this specification is addressed, it will be apparent that the embodiments aforedescribed may be varied to meet particular specialized requirements without departing from the true spirit and scope of the invention disclosed. For example, although the invention is described in the context of stacking apparatus adapted to grip the four sides of a preassembled layer of work products, the invention would also find utility in gripping individual ones of work products. In this instance, only two opposing clamps need be used to exert pressure on opposite sides of the work product. Moreover, whereas a reversible pneumatic motor 120 is described as drive means in the assembly 100, a pneumatic cylinder and piston arrangement with known drive coupling means, or an electric motor would function as well. The aforedescribed embodiments are therefore not to be taken as indicative of the limits of the invention, but rather as exemplary structures thereof which are described by the claims appended hereto.

The embodiments of the invention in which an exclusive property or privilege is claimed are defined as follows:

1. Apparatus for stacking work products comprising, in combination:
    first and second upstanding side walls disposed upon a supporting surface in spaced apart and substantially parallel relation;
    a back wall disposed intermediate the side walls and forming a close therewith having an open entry side and an open uppermost end of sufficient sectional area to allow passage therethrough of at least one preassembled layer of the work products;
    clamp means substantially circumscribing the open uppermost end in attached unobstructive relation therewith to provide an inwardly directed controllable clamping force intermediate the side walls, and intermediate the back wall and open entry side for releasably gripping a preassembled layer of the work products; and
    a safety curtain adapted to be drawn into a path substantially traversing sectional area of the open uppermost end for supporting the at least said sufficient one preassembled layer of the work products in the event of clamp means failure and out of the path to allow passage through the open end of subsequent preassembled layers of the work products.

2. Apparatus as claimed in claim 1, further comprising guide means for centrally positioning the preassembled layer of work products entering the open entry side into the apparatus.

3. Apparatus as claimed in claim 2, wherein the guide means comprises a pair of sloping side walls disposed convergingly inwardly to join respective ones of the two side walls as extensions thereof.

4. Apparatus as claimed in claim 3, wherein the clamp means comprises:
    a first side frame member joined to one side wall alongside the uppermost end thereof;
    a second side frame member joined to the second side wall alongside the uppermost end thereof; and
    first compression means fixedly connected to individual ones of the side frame members in opposing relation for controllably exerting an inwardly directed force therebetween.

5. Apparatus as claimed in claim 4, wherein the clamp means further comprises:
    a back frame member joined to the back wall alongside the uppermost end thereof;
    first and second front frame members attached to respective ones of the side frame members and extending inwardly thereof in a plane common to the side and back frame members; and
    second compression means fixedly connected to individual ones of the back and front frame members in opposing relation for controllably exerting an inwardly directed force therebetween.

6. Apparatus as claimed in claim 5, wherein each compression means comprises:
    a pressure plate spaced inwardly of each frame member; and
    extension means sandwiched between each pressure plate and corresponding frame member and fixedly attached thereto, the extension means being responsive to an applied pressurised fluid for restorably extending the extension means along a longitudinal axis thereof and restorably displacing the pressure plate in the same direction.

7. Apparatus as claimed in claim 6, further comprising tension spring means connected between a pressure plate and corresponding frame member for returning the pressure plate to a rest position when the pressurised fluid is released from the extension means.

8. Apparatus as claimed in claim 7, wherein the extension means comprises an expandable air bag.

9. Apparatus as claimed in claim 8, wherein the air bag comprises a resilient boot.

10. Apparatus as claimed in claim 9, wherein the boot comprises a cylinder having pleated side walls adapted to flexibly extend along the long axis of the cylinder.

11. Apparatus as claimed in claim 10, wherein the pressurised fluid comprises compressed air at a pressure of at least 50 pounds per square inch (343 kPA).

12. Apparatus as claimed in claim 10, wherein each pressure plate and respective support member have fixedly disposed therebetween at least two of said cylinders spaced apart in predetermined relation.

13. Apparatus as claimed in claim 12, further comprising control means for controllably applying the compressed air from a source thereof to individual ones of the cylinders.

14. Apparatus as claimed in claim 13, wherein the control means comprises:
    a control valve having an outlet, and an inlet communicating with the compressed air source; and
    a plurality of air conduits communicating with the outlet of the control valve and individual ones of inlet connectors communicating with corresponding ones of the cylinders.

15. Apparatus as claimed in claim 14, further comprising reinforcing stiffener means integrated with the walls externally of the apparatus interior.

16. Apparatus as claimed in claim 15, wherein the pressure plates each include a sloping wall portion disposed divergingly outwardly of the apparatus interior.

17. Apparatus as claimed in claim 16, wherein the pressure plates are coated with a urethane layer of 50–60 durometer.

18. Apparatus as claimed in claim 17 wherein the supporting surface comprises one side of a base plate.

19. Apparatus as claimed in claim 1, further comprising a safety cage disposed securely thereupon in substantial registry with the close defined by the apparatus walls, the cage having an open bottom end for admitting at least one preassembled layer of the work products, a blocked top end to limit the number of layers admitted and side walls circumscribing an enclosure.

20. Apparatus as claimed in claim 19, wherein one side wall of the cage comprises a hinged, lockable gate providing access to the enclosure.

21. Apparatus as claimed in claim 20, wherein the gate and remaining side walls of the cage each comprise a plurality of upstanding channel-shaped panels arranged in uniformly spaced relation and joined together by means of lower and upper frame members.

22. Apparatus as claimed in claim 1, wherein the curtain comprises:
- a pair of endless roller chains operably positioned within the apparatus in spaced relation on opposing sides of the open uppermost end and below the clamp means;
- a pair of rotatably mounted sprockets for each chain positioned in spaced relation within the apparatus and in operable engagement with a corresponding chain to form a pair of elongated endless roller chain loops along the path; and
- a plurality of cylindrical rollers traversing the space between the chains in uniformly spaced relation, each roller having opposite ends connected to a corresponding chain whereby rotation of corresponding end pairs of sprockets engaging the chains retractably draw the rollers across the sectional area of the open uppermost end of the apparatus.

23. Apparatus as claimed in claim 22, further comprising:
- a drive shaft interconnecting an end pair of sprockets; and
- reversible drive means coupled to the shaft for rotatably driving the sprockets.

24. Apparatus as claimed in claim 23, wherein the drive means comprises a pneumatic motor and control means connected intermediate the motor and a compressed air source.

25. Apparatus for stacking work products comprising, in combination:
- first and second upstanding side walls disposed upon a supporting surface in spaced apart and substantially parallel relation;
- a back wall disposed intermediate the side walls and forming a close therewith having an open entry side and an open uppermost end of sufficient sectional area to allow passage therethrough of at least one preassembled layer of the work products;
- first clamp means disposed at the open uppermost end in attached unobstructive relation therewith to provide an inwardly directed controllable clamping force intermediate the side walls for releasably gripping a preassembled layer of the work products; and
- a safety curtain adapted to be drawn into a path substantially traversing sectional area of the open uppermost end for supporting the at least said sufficient one preassembled layer of the work products in the event of clamp means failure and out of the path to allow passage throught the open end of subsequent pareassembled layers of the work products.

26. Apparatus for stacking work products as claimed in claim 25 further comprising, in combination:
- a pair of front frame members attached to and extending inwardly of respective ones of side walls at the open entry side; and
- second clamp means disposed at the open uppermost end in attached unobstructive relation therewith to provide an inwardly directed controllable clamping force intermediate the back wall and the front frame members, the first and second clamp means substantially circumscribing the open uppermost end for releasably gripping a preassembled layer of a plurality of work products.

27. Apparatus as claimed in claim 25, wherein the safety curtain comprises:
- a pair of endless roller chains operably positioned within the apparatus in spaced relation on opposing sides of the open uppermost end and below the clamp means;
- a pair of rotatably mounted sprockets for each chain positioned in spaced relation within the apparatus and in operable engagement with a corresponding chain to form a pair of elongated endless roller chain loops along the path; and
- a plurality of cylindrical rollers traversing the space between the chains in uniformly spaced relation, each roller having opposite ends connected to a corresponding chain whereby rotation of corresponding end pairs of sprockets engaging the chains retractably draw the rollers across the sectional area of the open uppermost end of the apparatus.

28. Apparatus as claimed in claim 27, wherein the safety curtain further comprises:
- a drive shaft interconnecting an end pair of sprockets; and
- reversible drive means coupled to the shaft for rotatably driving the sprockets.

29. Apparatus as claimed in claim 28, wherein the drive means comprises a pneumatic motor and control means connected intermediate the motor and a compressed air source.

30. Apparatus as claimed in claim 25, further comprising a safety cage disposed securely upon the apparatus in substantial registry with the close defined by the apparatus walls, the cage having an open bottom end for admitting at least one preassembled layer of the work products, a blocked top end to limit the number of layers admitted and side walls circumscribing an enclosure.

31. Apparatus as claimed in claim 30, wherein one side wall of the cage comprises a hinged, lockable gate providing access to the enclosure.

32. Apparatus as claimed in claim 31, wherein the gate and remaining side walls of the cage each comprise a plurality of upstanding channel-shaped panels arranged in uniformly spaced relation and joined together by means of lower and upper frame members.

\* \* \* \* \*

UNITED STATES PATENT AND TRADEMARK OFFICE
CERTIFICATE OF CORRECTION

PATENT NO : 6,045,324
DATED : April 4, 2000
INVENTOR(S): Paul W. Redman

It is certified that error appears in the above-identified patent and that said Letters Patent is hereby corrected as shown below:

Col. 5, line 26, after "plates" and before "56" delete the period ".".

Col. 7, line 42, after "traversing" and before "sectional" insert -- said sufficient --.

Col. 7, line 43, delete "said sufficient".

Col. 9, line 47, after "traversing" and before "sectional" insert -- said sufficient --.

Col. 9, line 48, delete "said sufficient".

Col. 9, line 51, delete "throught" and insert -- through --.

Signed and Sealed this

Sixth Day of February, 2001

Attest:

Q. TODD DICKINSON

*Attesting Officer*  *Director of Patents and Trademarks*